(12) United States Patent
Chan et al.

(10) Patent No.: US 6,470,494 B1
(45) Date of Patent: Oct. 22, 2002

(54) CLASS LOADER

(75) Inventors: Victor S. Chan, Thornhill; Shirley S. Chiang, North York; David K. Stokes, Toronto; Leonard W. Theivendra, Scarborough, all of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,205

(22) Filed: Nov. 29, 1999

(30) Foreign Application Priority Data

Nov. 30, 1998 (CA) ............................................. 2255042

(51) Int. Cl.[7] ............................................. G06F 9/45
(52) U.S. Cl. ........................................ 717/166; 717/139
(58) Field of Search ........................ 717/11, 139, 166; 709/200–222

(56) References Cited

U.S. PATENT DOCUMENTS

| | | | | |
|---|---|---|---|---|
| 5,247,681 A | | 9/1993 | Janis et al. .................. 709/305 |
| 5,369,766 A | * | 11/1994 | Nakano et al. .............. 709/305 |
| 5,410,698 A | | 4/1995 | Danneels et al. ........... 709/305 |
| 5,802,367 A | * | 9/1998 | Held et al. .................. 709/305 |
| 5,923,878 A | * | 7/1999 | Marsland ..................... 717/139 |
| 5,966,542 A | * | 10/1999 | Tock ............................. 717/11 |
| 5,983,021 A | * | 11/1999 | Mitrovic ........................ 717/5 |
| 6,072,953 A | * | 6/2000 | Cohen et al. .................. 717/10 |
| 6,112,025 A | * | 8/2000 | Mulchandani et al. ......... 717/9 |
| 6,279,030 B1 | * | 8/2001 | Britton et al. .............. 709/203 |

OTHER PUBLICATIONS

"20.14" The Class java.lang.ClassLoader, Java Language Specification, First Edition, pp. 1–3.
"Execution", Java Language Specification, First Edition, Chapter 12, pp. 1–16.
"Class java.lang.ClassLoader", All Packages, Class Hierarchy, This Package, Previous, Next Index, pp. 1–7.
"Understanding Extension Class Loading", Creating and Using Extensions, pp. 1–2.
"5 Secure Class Loading", Java Security Architecture, pp. 1–6.

* cited by examiner

Primary Examiner—Tuan Q. Dam
Assistant Examiner—John Q. Chavis
(74) Attorney, Agent, or Firm—Scully, Scott, Murphy & Presser; Manny W. Schecter, Esq.

(57) ABSTRACT

This invention relates to the loading of classes in programming environments, and in particular, Java programming environments. This invention discloses a system and method that permits dynamic loading of classes during the execution of Java programs. This invention allows for classes to be loaded despite the fact that such classes may not reside in the current path or working directory within a Java programming environment. This invention also discloses a system and method for archiving files in an archive file that provides customized entry names for the archived files.

16 Claims, 3 Drawing Sheets

CLASS LOADER

BACKGROUND OF THE INVENTION

1. Technical Field

The present invention relates to class loaders in software environments and the dynamic loading of classes during the execution of program files.

2. Prior Art

Currently, in typical Sun Microsystems, Inc.'s Java™ software programming language environments, the execution of Java programs first requires that the source code for these programs be compiled into Java bytecodes, which are instructions for a virtual computer, called the Java virtual machine (JVM). A JVM may be implemented either in software (as a JVM interpreter) or in hardware (as a JVM chip).

Java program source code typically consists of a set of classes stored in a series of class files. After the classes are compiled into lava bytecodes are then typically loaded into memory by a class loader for interpretation by a JVM interpreter before the associated program is executed. Class loading can also occur when a Java program dynamically attempts to load another class at run time.

In current Java programming environments (e.g. the Java Development Kit (JDK) produced by Sun Microsystems, Inc.), the default class loader makes use of an environment-variable which stores directory information on where the class loader should look for class files on a secondary storage device. For instance, when programming in Java using the JDK, an environment variable called CLASSPATH, is used for this purpose. In addition to directories, the CLASSPATH environment variable can also specify Java archive files (.jar files) from which classes can be loaded. Unfortunately, this Java programming environment does not allow for the modification of the CLASSPATH environment variable in a JVM during the execution of a program. As a result, certain directories and jar files cannot be dynamically specified at run time. Thus, the programmer is required to specify the location of all classes forming part of a program to be executed prior to run time, even in cases where it may not be feasible or possible to do so.

For example, in some cases, the location of certain classes which require loading is known only at run time. This situation may arise when an application to create a .jar file s being executed, and the classes to be included in the jar file need to be determined during execution of the application. Alternatively, it may be impossible at run time to obtain or specify the location of classes used by other classes or applications which reside on a remote machine.

Furthermore, standard tools for creating .jar files in Java programming environments cause the entry name of each class file or other file in a Java archive to reflect where the file is physically located in a file system, as well as where the archiving tool is being called from.

For example, when using the JDK, if files A.class and B.class in the package com.ibm.ejs were to be placed in a .jar archive file with entry names com/ibm/ejs/A.class and com/ibm/ejs/B. class respectively, a standard Jar archiving tool might be called using the.command:

jar-cvf out.jar com/ibm/ejs/A.class com/ibm/ejs/B.class if the Jar archivig tool was called from the same directory which stores the class files for the package com.ibm.ejs. If the Jar archiving tool were to be called from a different directory, the input parameters in the above command would have to be changed to reflect the location from which the Jar archiving tool was being called. For example, if the Jar archiving tool is called from the directory 'work', the Jar archiving tool would be called using the command:

jar-cvf out.jar work/com/ibm/ejs/A.class work/com/ibm/ejs/B.class and as a result, te entry name of the classes in the .jar archive file will also be modified to reflect the location from which the Jar archiving tool was being called. Therefore, if the Jar archiving tool is called from the directory 'work', the entry name of A.class and B.class stored in the .jar archive file wold be work/com/ibm/ejs/A.class and work/com/ibm/ejs/B.class respectively. A JVM which is looking for a particular class in the .jar archive file when executing a program, may have difficultly locating the file in a situation where the entry name has been so modified.

One possible solution to this problem would be to change the working directory in the current programming environment so that the Jar archiving tool is always called from the directory in which a particular file to be added to a .jar archive file resides. This may require the working directory to be changed several times if there are numerous files being added to .jar archive file which reside in different directions. In some cases the files to be added to a .jar archive file may even reside on a remote system. Since the working directory for a JVM cannot be dynamically changed at run time, and since causing the Jar archiving tool to be called from a different directory is neither always feasible nor always possible, standard tools in the JDK do not afford a flexible solution to this problem.

It will be appreciated by those skilled in the art, that a programming environment which allows for the loading of classes without the need for specifying a path prior to the execution of a program would allow for greater flexibility in the use and design of such programs.

Furthermore, with respect to creating jar files, flexibility in the use and design of such programs would be further enhanced if the entry name of a class file or other file to be placed in a jar chive could be assigned a name that is independent of where the file is physically located on a file system and of where a Jar archiving tool may be called from.

SUMMARY OF THE INVENTION

According to an aspect of the invention, there is provided a dynamic class loader computer product for providing a class in executable form in response to a request for said class, said dynamic class loader computer product comprising a first structure comprising pointers for byte representations of classes in a memory; means for checking if a pointer for said class is provided in the first structure; conversion means for converting said class into executable form using the byte representation of said class pointed to by the pointer; and means for providing said class so converted in response to the request. The dynamic class loader computer product may further comprise an input means for receiving into the memory the byte representation of said class and a name of said class and for adding a pointer to the first structure for the byte representation of said class. Further, the dynamic class loader computer product may comprise second structure containing a pointer to said class in executable form in memory. Additionally, the dynamic class loader computer product may comprise means for checking if a pointer for said class is provided in the second structure and if provided, instead of providing said class so converted, providing said class in executable form in memory pointed to by that pointer in response to the request. The dynamic class loader computer product may further comprise means for adding a pointer to the second structure for said class in executable form in memory. And, there is provided a dynamic class loader computer product wherein said dynamic class loader computer product provides a means to invoke a different class loader computer product should said dynamic class loader product be unable to locate a pointer for said class in response to the request. Also, said first structure may be a first hash table, said second structure may be a second hash table and the classes may be Java class files.

In accordance with another aspect of the invention, there is provided a method for loading a class in executable form in response to a request for said class comprising the steps of providing a first structure comprising pointers for byte representations of classes in a memory; checking if a pointer for said class is provided in the first structure; converting said class into executable form using the byte representation of said class pointed to by the pointer; and providing said class so converted in response to the request. Said method may further comprise the step of receiving into the memory the byte representation of said class and a name of said class and adding a pointer to the first structure for the byte representation of said class. And, the method may further comprise the step of providing a second structure containing a pointer to said class in executable form in memory. The method may also comprise the step of checking if a pointer for said class is provided in the second structure and if provided, instead of providing said class so converted, providing said class in executable form in memory pointed to by that pointer in response to the request and also comprise the step of adding a pointer to the second structure for said class in executable form in memory. Additionally, the method may comprise the step of invoking a default class loader if a pointer for said class cannot be located.

In accordance with another aspect of the invention, there is provided a method for loading files, said method comprising the steps of determining if said file resides in a memory as a byte representation of said file; if said file is located by step a) then loading said file for execution; else invoking a default class loader to load said file into the memory.

There is also provided a program storage device readable by a data processing system, tangibly embodying a program of instructions, executable by said data processing system to perform the-above method steps.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

In a preferred embodiment, the present invention provides a facility to load classes for use by a Java interpreter without having to specify the location of the classes prior to run time. This is accomplished through a dynamic class loader disclosed herein. The dynamic class loader can replace or be used in conjunction with a default class loader found in typical Java programming environments or class loaders in other environments that provide equivalent function or have similar behavior as the typical default class loader in Java programming environments. The function of the default class loader in a typical Java programming environment is described below.

Figure 1:
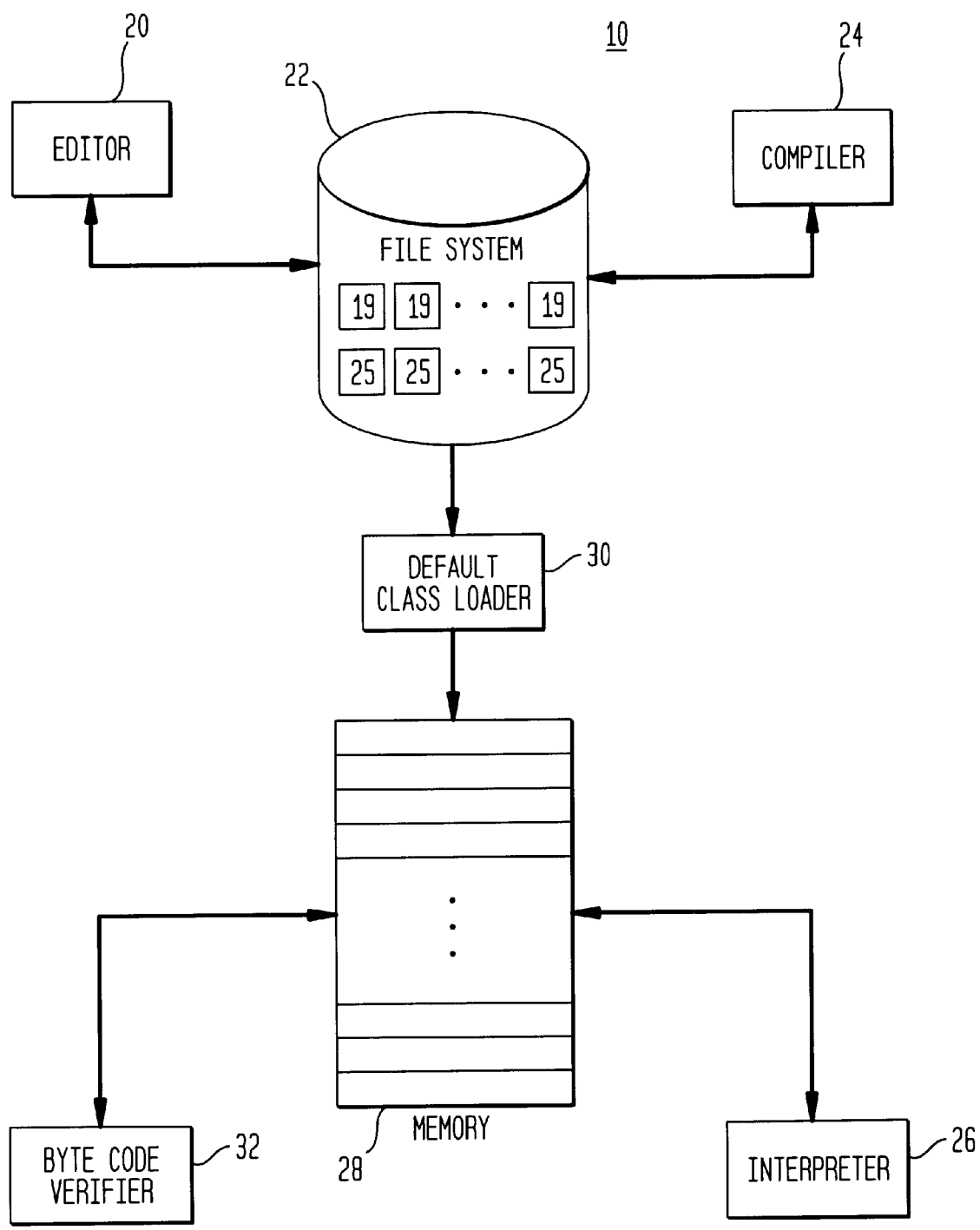
FIG. 1 is a schematic diagram illustrating the components in a typical Java programming environment associated with the execution of a Java program.

FIG. 1 illustrates the components in a typical Java programming environment, shown generally as 10, associated with the execution of a Java program. Java programs typically go through five phases to be executed, although it will be appreciated by those skilled in the art, that there may be variations, for instance, depending on the particular operating platform.

The first phase consists of file editing which is typically accomplished with an editor program 20 (e.g. a built-in editor in a Java development environment). In this phase, the programmer creates Java program source code 19 using the editor program 20 and makes modifications to the Java program source code 19 if necessary. The Java program source code 19 is then stored on a file system 22, which typically resides on a secondary storage device (e.g. a hard disk) but the file system 22 may be distributed across several storage devices. The Java program source code may also simply be stored in memory. The Java program source code 19 is typically stored with a name ending in java extension.

The second phase consists of program compilation where a Java compiler 24 translates the Java program source code 19 into Java bytecodes, which are instructions for a virtual computer, called the Java virtual machine (JVM). If the program compilation by the Java compiler 24 is successful, .class file(s) 25 will be created and stored on the file system 22, which will contain the bytecodes associated with the Java program source code 19 being compiled. Again, the .class file(s) may also simply also be stored in memory.

The third phase consists of class loading where the bytecodes of the .class file(s) 25 created in the second phase, must first be placed in a memory 28 before it can be executed. Memory can include random access memory (RAM), a RAM disk or any other memory type device apparent to those skilled in the art. Typically, class loading is done by a default class loader 30 which takes the bytecodes of the .class file(s) 25 from the file system 22 and writes to the memory 28 in an executable form suitable for interpretation by a Java interpreter 26 such as a JVM. The JDK provides such a default class loader. Alternatively, the bytecodes of the .class file(s) can be loaded into the memory 28 from a remote secondary storage device over a network. In either case, the loading into memory for use includes not only the physical transfer of the .class file(s) but also standard initialization required by a JVM; it is whatever steps are required to convert .class file into an executable form for the Java interpreter. In the preferred embodiment of the present invention, a dynamic class loader 40 (FIG. 2) as disclosed herein is used in conjunction with the default class loader 30 to assist in this phase.

One method of causing the default class loader 30 to begin loading of .class file(s) 25 is to invoke a Java interpreter 26 using an appropriate command (e.g. .'java<filename>' in the JDK. where <filename> is substituted with the name of a .class file 25 to be loaded and interpreted). Alternatively, the default class loader 30 may also be executed when certain Java programs (i.e. applets) are loaded into a World Wide Web browser.

In the fourth phase, before the bytecodes of the class file(s) 25 are executed by the Java interpreter 26, the bytecodes are verified by a bytecode verifier 32. The bytecode verifier 32 ensures that the bytecodes are valid and that they are in conformity with Java security restrictions.

Finally, in the last phase, the interpreter 26 reads the bytecodes of the .class file(s) 25 stored in the memory 28, and translates them into a language that the computer can understand, possibly storing data values as the program executes. It order for a computer to be able to execute Java programs, an interpreter 26 for Java bytecodes must be supplied. The interpreter 26 can be a software program that imitates the actions of a JVM. Alternatively, a computer can utilize a hardware chip that executes Java bytecodes directly.

With respect to the third phase as described above, in current Java programming environments, a default class loader 30 typically makes use of an environment variable which stores information as to where the default class loader 30 should look for a .class file 25 on a file system 22. For example, when using the JDK, an environment variable called CLASSPATH is used for this purpose. In addition to directories, the CLASSPATH environment variable can also specify Java archive files 46 (FIG. 2), also known as .jar files, from which classes can be loaded. While the default class loader 30 of the JDK typically requires the location of these directories and Java archive files 46 to be specified prior to run time, the dynamic class loader 40 as shown in FIG. 2 which is part of the present invention does not make this a requirement.

Figure 2:
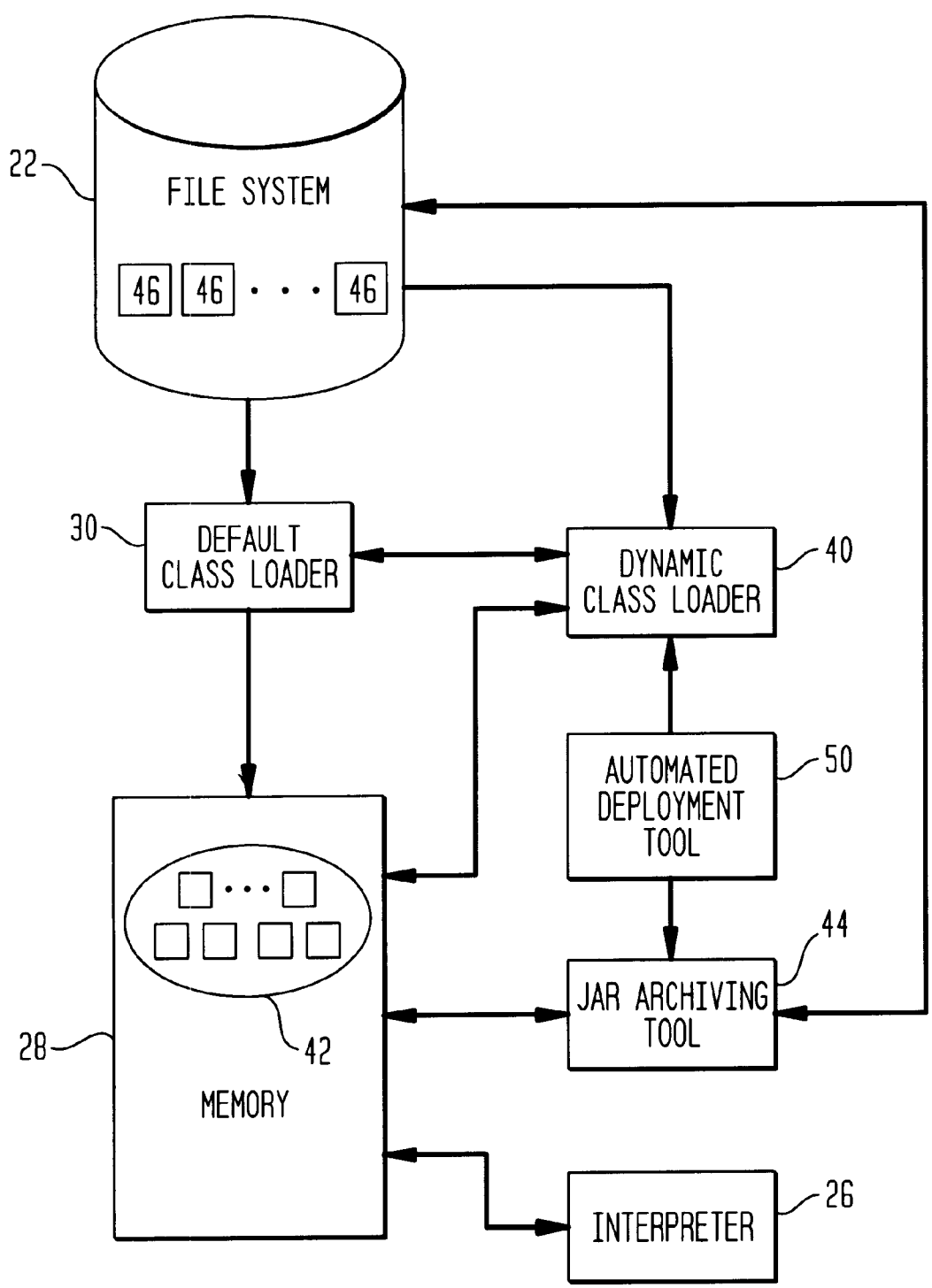
FIG. 2 is a schematic diagram illustrating the present invention in a preferred embodiment.

Referring to FIG. 2, the dynamic class loader 40 of the present invention in its preferred embodiment is used in conjunction with the default class loader 30 to load a class (which is in the form of a class file 25) into the memory 28 in a form suitable for interpretation by a Java interpreter 26 of FIG. 1.

The dynamic class loader 40 maintains a set of pointers (referred to in the Java programming language as references) to classes (in the form of bytecodes) that have already been loaded into the memory 28 for interpretation by a Java interpreter 26. In the preferred embodiment of the invention, the pointers to the classes are stored in a hash table, and are indexed by class name.

In the preferred embodiment of the present invention, the dynamic class loader 40 also works in conjunction with one or more byte representations of class files 42 (i.e. bytecodes of .class files 25) provided by the user or an application (e.g. addClass method of Appendix 'A'). The byte representations of the files 42 reside in the memory 28. Where the dynamic class loader 40 works in conjunction with these byte representations, a second hash table is used by the dynamic class loader 40 to store pointers (references) to these byte representations in memory and are indexed by class name. In another embodiment of the invention, the second hash table of the dynamic class loader 40 can be used to store pointers (in the form of bytecodes) residing elsewhere in the computer memory 28 in a collection of Jar entry meta-objects, as described later. As classes (in the form of bytecodes) are accessible using the pointers in the second hash table of the dynamic class loader 40, there is no need to access the corresponding .class files stored on a file system 22, and there is no need to store information on where the corresponding .class files are physically located on the file system 22.

If, for example, upon the execution of an application a particular class needs to be loaded from the file system 22 into the memory 28 in an executable form suitable for interpretation by a Java interpreter 26, the application will ask the dynamic class loader 40 to load the class by calling the load method of the dynamic class loader 40 (e.g. loadClass method of Appendix "A"). The dynamic class loader 40 checks its hash table consisting of pointers to classes already loaded into the memory 28, to determine if the requested class has been loaded into the memory 28 in an executable form suitable for interpretation by a Java interpreter 26.

If the class has not already been loaded into the memory 28 in an executable form suitable for interpretation by a Java interpreter 26, the dynamic class loader 40 checks to see if the class resides in the one or more byte representations stored in memory, by consulting its second hash table consisting of pointers to classes stored as one or more byte representations in memory. If the dynamic class loader 40 determines that the class is within the one or more byte representations stored in memory, the dynamic class loader 40 will load the class into the memory 28 in an executable form suitable for interpretation by a Java interpreter, by calling a standard utility method (defineClass) available in the java programming environment which is used for that purpose. Furthermore, a pointer to the class so loaded into the memory 28 for interpretation by a Java interpreter 26 will be created by the dynamic class loader 40, and stored in the hash table maintained by the dynamic class loader 40 used to keep track of classes that have already been loaded into the memory 28 in an executable form suitable for interpretation by a Java interpreter 26.

If the hash table of the dynamic class loader 40 that keeps track of classes contained in the one or more representations stored in memory does not contain a pointer to the class which needs to be loaded, the dynamic class loader 40 can request the default class loader 30 to search for the class in a default path.

In the preferred embodiment of the present invention, Jar entry meta-objects refer to files stored in a .jar archive file and are instances of the following class represented by the following pseudo-code:

Class Jar Entry{
    String Entry Name://Name of Entry in the .jar archive file (including directory information if applicable)
    String File Name;//File name of the file if it physically exists on the file system (such as in a working directory)
    byte[]byte Array;//Byte representation of the file
    //Constructor Methods
    //Methods to retrieve the byte representation of the file
}

The pseudo-code for implementing the dynamic class loader 40 can be found in Appendix "A". In this implementation, the class defining a Java default class loader 30 is extended to create the dynamic class loader 40.

Another aspect of the present invention comprises a Jar archiving tool 44 which enables archived classes to be named irrespective of where the class files may be located on a file system 22. The Jar archiving tool 44 comprises archiving routines for the creation of .ja files 46 using the classes and files stored in the collection of Jar entry meta-objects 42 as its source. As the byte representation of the classes to be archived are available through the collection of Jar entry meta-objects 42, the physical location of the class files on the file system 22 is irrelevant, and each meta-object can optionally be assigned a custom entry name or instead the Jar entry meta-objects preserve the file name and directory information of the files. Pseudo-code for implementing the Jar archiving tool 44 can be found in Appendix "B".

Figure 3:
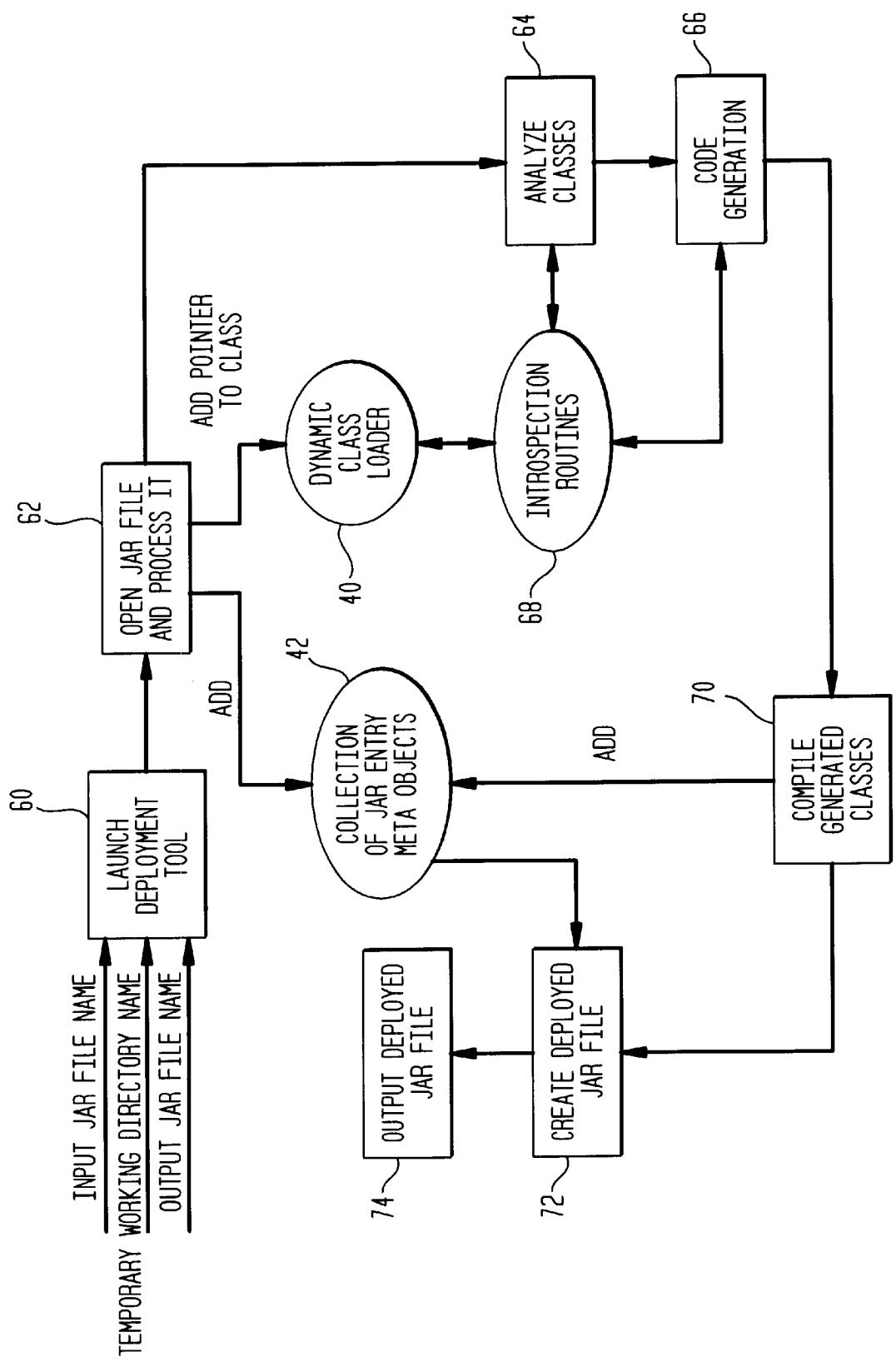
FIG. 3 is a schematic diagram illustrating how the present invention may be employed in the execution of an automated deployment tool.

Referring to FIG. 3, a schematic diagram is provided illustrating how the dynamic class loader 40 and the Jar archiving tool 44 of the present invention may be employed in the execution of an automated deployment tool 50 (FIG. 2). An example of such an automated deployment tool 50 is an Enterprise JavaBeans™ (EJB) deployment tool. The automated deployment tool 50 prepares objects, such s Enterprise JavaBeans components, for use on a specific server, such as an EJB server. The automated deployment tool 50 may be called by various other administration tools and by multiple, possibly remote, users. As those skilled in the art will appreciate, the dynamic class loader 40 and the Jar archiving tool 44 of the present invention address the typical problems in locating classes (e.g. fixed class path, fixed working directory) encountered by programs such as the automated deployment tool 50.

After the automated deployment tool 50 (which in the preferred embodiment, takes an input Jar file name, a temporary working directory name and an output Jar file name) is launched at Step 60, an input .jar file 46 (FIG. 2) is opened and processed at Step 62. Processing at Step 62 includes the extraction of files (which can be specified by a user or a program) by the Jar archiving tool 44 (FIG. 2) tom the input .jar file 46, and the storing of the byte representations of the files in the collection of Jar entry meta-objects 42. Processing at Step 62 also includes the creation by the dynamic class loader 40 of a new pointer for each new class added to the collection of Jar entry meta-objects 42 during the extraction stage. The pointers are then stored in the second hash table of the dynamic class loader 40 that keeps track of classes contained in the collection of Jar entry meta-objects 42. The creation and storing of pointers in this stage of processing may be implemented in an add class method (e.g. addClass method of Appendix "A").

Processing at Step 62 may also include the "de-serialization" of classes. De-serialization is a process whereby a class is re-instantiated, after an instance of the class had been saved to a file (i.e. serialized). For instance, when the deployment tool 50 is launched, all serialized classes (.scr files) in an input .jar file 46 (FIG. 2) are de-serialized in the processing stage, and all classes (.class files) referred to by the class being de-serialized need to be loaded by the dynamic class loader 40 into the memory 28 in a form suitable for interpretation by a Java interpreter 26. The de-serialization process can be implemented by extending the functionality of a de-serialization I/O routine provided in typical Java programming environments to use the dynamic class loader 40 to load classes referred to be the class being de-serialized. One possible implementation of this process is provided as pseudo-code in Appendix "C".

In the Analyze Class process at Step 64, the classes in the input .jar file 46 (FIG. 2) are loaded by the dynamic class loader 40 into the memory 28 in a form suitable for interpretation by a Java interpreter 26, if they have not already been loaded at Step 62. A class analyzer of the automated deployment tool 50 then determines if other classes are needed so that the classes can be used on a specific server. If so, these new classes will be generated at Step 66 by a code generator, eventually to be added to the input .jar file 46 (FIG. 2) to form a new .jar file. A temporary directory may be specified at Step 60 that can be used for storing the generated classes. It will be appreciated by those skilled in the art, that these actions require the dynamic loading of the new classes, particularly since the temporary directory when provided as input, is unknown until after the automated deployment tool 50 is launched and the default class loader may not know where to find such classes.

During the Analyze Class process at Step 64 and the Code Generation process at Step 66, class analyzers and code generators will require information on classes (e.g. the handle to a class, information about its methods and fields) previously stored in the input .jar file 46 (FIG. 2). Introspection (dynamic inspection) routines 68 which enable code generators and class analyzers to obtain needed information about a class utilize the dynamic class loader 40. As there will likely be multiple requests for information by class analyzers and code generators on a particular class in the input .jar file 46, the dynamic class loader 40 provides for an efficient way of retrieving the information, since one of the hash tables of the dynamic class loader 40 maintains pointers to classes, including those from the input .jar file 46, that have been loaded into the memory 28 in a form suitable for interpretation by a Java interpreter 26. The class for which information is sought can be more quickly accessed via this pointer from the memory 28, and need not be accessed from the input .jar file 46 which typically resides in secondary storage.

After the new classes are generated (as .java source files), they are compiled into class files (.class) and are added to the collection of Jar entry meta-objects 42 at Step 70. These are new files not archived in the original input .jar file 46 but instead will be included in a .jar file to be produced as output by the automated deployment tool 50 at Step 72.

At Step 72, a deployed .jar file (not shown) is created using the Jar archiving tool 44 (FIG. 2) and the collection of Jar entry meta-objects 42 as a source. Subsequently, at Step 74, the deployed .jar file is outputted to a file system 22, and will either overwrite the input .jar file 46, or be written to a new file on the file system 22.

It will be apparent to those skilled in the art, that the application of the invention herein disclosed is not limited to programs and programming environments based on the Java programming language.

The invention may be implemented on a stand-alone basis, integrated into an application wherein the invention is a feature such an integrated software development environment or integrated into an application to further process the output and/or provide the variable inputs including the classes, class names and Jar file names.

The invention may be implemented as a program storage device readable by a data processing system, tangibly embodying a program of instructions, executable by said data processing system to perform the method steps of the invention. Such a program storage device may include. diskettes, optical discs, tapes, CD-ROMS, hard drives, memory including ROM or RAM, computer tapes or other storage media capable of storing a computer program.

The invention may also be implemented in a computer system. In a preferred embodiment, a system is provided comprising a computer program operating on a data processing system, with the computer program embodying the method of the invention and producing an output of the method on a display or output device. Data processing systems include computers, computer networks, embedded systems and other systems capable of executing a computer program. A computer includes a processor and a memory device and optionally, a storage device, a video display and/or an input device. Computers may equally be in stand-alone form (such as the traditional desktop personal computer) or integrated into another apparatus (such as a cellular telephone).

While the invention has been particularly shown and described with respect to preferred embodiments thereof, it will be understood by those skilled in the art that the foregoing and other changes in form and details may be made therein without departing from the spirit and scope of the invention.

APPENDIX A

Pseudo-Code for Class Loader

```
public class ByteArraySetClassLoader extends ClassLoader {
    // ClassLoader is Java39s default class loader
    // Hashtable of class byte[ ]'s to be loaded indexed by class name
    // (this is the set which loader uses to find/resolve classes)
    private static Hashtable classBytes = new Hashtable( );
    // Hashtable of class already loaded
    private static Hashtable loadedClasses = new Hashtable( );
/**
 * Adds a class byte[ ] to current set of classes
 */
public static final void addClass( String name, byte[ ] data ) {
    // method implementation
}
/**
 * Loads a specified class.
 */
protected Class loadClass(String name, boolean resolve) throws
```

APPENDIX A-continued

Pseudo-Code for Class Loader

```
ClassNotFoundException {
    // Check if class is already loaded
    Class cl = (Class) loadedClasses get(name);
    if ( cl == null) {
        try {
            // Load class bytes from current set of class byte[ ]'s
            // (throw exception if byte[ ] is null
        }
        catch ( ClassNotFoundException e) {
            // Attempt to load class from system classpath
            // because requested class was not found in
            // current set by calling the default class loader
        }
        // Register class as loaded by adding it to hashtable
    }
    if ( resolve )
        resolveClass(cl);
    return c::
}
```

APPENDIX B

Pseudo-Code for Jar Archiving Tool

```
public class JarUtils {
/**
 * Create a jar file given a jar filename, set of jar entries, and a working directory.
 *
 * parameter 1: File name of jar to be created
 * parameter 2: Vector of jar entry meta-objects
 * parameter 3: Directory name to hold temporary files
 */
public static final void createJar( String fileName, Vector jarEntries, String
workingDir ) {
    // Method implementation using standard Java I/O library
}
/**
 * Extracts a given jar file given jar filename, destination directory, and
 * file exclusion filter.
 * NOTE - The returned set of jar entries will include all the files in the
 * source jar as byte array representations,
 *     but the specified exclude files will not be extracted
 *     - if destination directory is null, no files will be physically
 * extracted.
 *
 * parameter 1: Filename of jar to be extracted
 * parameter 2: Directory name for files to be extracted into
 * parameter 3: Exclude string specifying file patterns to be NOT extracted
 *     onto the file system (i.e. "*java")
 */
 public static final Vector extractJar String srcJarFile String dstDir
String excuseFilter ) {
    // Method implementation using standard Java I/O library
}
}
```

APPENDIX C

Pseudo-Code for the Deserialization Routine that Employs the Dynamic Class Loader

```
public class ObjectInputStreamCustomResolver extends ObjectInputStream
{
/* ObjectInputStream is the class which houses the default deserialization
   routines */
/**
```

APPENDIX C-continued

Pseudo-Code for the Deserialization
Routine that Employs the Dynamic Class Loader

```
* This overrides the default resolveClass( ) method to use
* a custom class loader. This method is called by the standard
* deserialization routine whenever a class needs to be loaded.
* (NOTE: The application never calls this method)
*
* Parameter: A class descriptor object containing the class name, etc.
*/
protected Class resolveClass( ObjectStreamClass classDesc ) {
    // Call our classloader to load the class and return
    // the handle to it.
}
}
```

Having thus described our invention, what we claim as new, and desire to secure by Letters Patent is:

1. A dynamic class loader computer product for providing a class in executable form in response to a request for said class, said dynamic class loader computer product comprising:
   a first structure comprising pointers for byte representations of classes in a memory;
   means for checking if a pointer for said class is provided in the first structure;
   conversion means for converting said class into executable form using the byte representation of said class pointed to by the pointer; and
   means for providing said class so converted in response to the request.

2. The dynamic class loader computer product of claim 1 further comprising an input means for receiving into the memory the byte representation of said class and a name of said class and for adding a pointer to the first structure for the byte representation of said class.

3. The dynamic class loader computer product of claim 1 further comprising a second structure containing a pointer to said class in executable form in memory.

4. The dynamic class loader computer product of claim 3 further comprising means for checking if a pointer for said class is provided in the second structure and if provided, instead of providing said class so converted, providing said class in executable form in memory pointed to by that pointer in response to the request.

5. The dynamic class loader computer product of claim 3 further comprising means for adding a pointer to the second structure for said class in executable form in memory.

6. The dynamic class loader computer product of claim 1 wherein said dynamic class loader computer product provides a means to invoke a different class loader computer product should said dynamic class loader computer product be unable to locate a pointer for said class in response to the request.

7. The dynamic class loader computer product of claim 3 wherein said first structure is a first hash table and said second structure is a second hash table.

8. The dynamic class loader computer product of claim 1 wherein the classes are Java class files.

9. A method for loading a class in executable form in response to a request for sad class comprising the steps of:
   providing a first structure comprising pointers for byte representations of classes in a memory;
   checking if a pointer for said class is provided in the first structure;
   converting said class into executable form using the byte representation of said class pointed to by the pointer; and
   providing said class so converted in response to the request.

10. The method of claim 9 further comprising the step of receiving into the memory the byte representation of said class and a name of said class and adding pointer to the first structure for the byte representation of said class.

11. The method of claim 9 further comprising the step of providing a second structure containing a pointer to said class in executable form in memory.

12. The method of claim 11 further comprising the step of checking if a pointer for said class is provided in the second structure and if provided, instead of providing said class so converted, providing said class in executable form in memory pointed to by that pointer in response to the request.

13. The method of claim 11 further comprising the step of adding a pointer to the second structure for said class in executable form in memory.

14. The method of claim 9 further comprising the step of invoking a default class loader if a pointer for said class cannot be located.

15. A method for loading files, said method comprising the steps of:
   a) determining if said file resides in a memory as a byte representation of said file;
   b) if said file is located by step a) then loading said file for execution; else
   c) invoking a default class loader to said file into the memory.

16. A program storage device readable by a data processing system, tangibly embodying a program of instructions, executable by said data processing system to perform a method for loading a class in executable form in response to a request for said class, said method comprising the following steps:
   providing a first data structure comprising pointers for byte representations of classes in a memory;
   checking if a pointer for said class is provided in the first structure;
   converting said class into executable form using the byte representation of said class pointed to by the pointer; and
   providing said class so converted in response to the request.

* * * * *